United States Patent
Takabayashi et al.

(10) Patent No.: US 9,908,340 B2
(45) Date of Patent: Mar. 6, 2018

(54) IMAGE FORMATION METHOD

(71) Applicant: Konica Minolta, Inc., Chiyoda-ku, Tokyo (JP)

(72) Inventors: Toshiyuki Takabayashi, Tokyo (JP); Ai Kondo, Tokyo (JP); Yuka Yazaki, Kanagawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/300,004

(22) PCT Filed: Mar. 30, 2015

(86) PCT No.: PCT/JP2015/060001
§ 371 (c)(1),
(2) Date: Sep. 28, 2016

(87) PCT Pub. No.: WO2015/152177
PCT Pub. Date: Oct. 8, 2015

(65) Prior Publication Data
US 2017/0145230 A1    May 25, 2017

(30) Foreign Application Priority Data

Apr. 3, 2014    (JP) ................................ 2014-077228

(51) Int. Cl.
*B41J 2/14*   (2006.01)
*B41J 2/155*   (2006.01)
(Continued)

(52) U.S. Cl.
CPC ............... *B41J 2/2146* (2013.01); *B41J 2/14* (2013.01); *B41J 2/155* (2013.01); *B41J 11/002* (2013.01);
(Continued)

(58) Field of Classification Search
CPC ................................ B41J 2/155; C09D 11/10
See application file for complete search history.

(56) References Cited

U.S. PATENT DOCUMENTS

| | | | |
|---|---|---|---|
| 2004/0165026 A1 | 8/2004 | Ikemoto et al. | |
| 2009/0231374 A1* | 9/2009 | Van de Wynckel | ... B41J 2/2135 347/12 |

(Continued)

FOREIGN PATENT DOCUMENTS

| | | |
|---|---|---|
| EP | 2692804 A1 | 2/2014 |
| EP | 2840119 A1 | 2/2015 |

(Continued)

OTHER PUBLICATIONS

English translation of the Written Opinion of the International Searching Authority corresponding to Application No. PCT/JP2015/060001; dated Oct. 4, 2016.

(Continued)

*Primary Examiner* — Kristal Feggins
*Assistant Examiner* — Kendrick Liu
(74) *Attorney, Agent, or Firm* — Cantor Colburn LLP

(57) ABSTRACT

Provided is a method for inkjet image formation using a line head and an activating light beam-curing type ink, characterized in that the duration from the time, from a first ink lands on a recording medium, to the time that the first ink or a second ink of the same color series as the first color lands on the recording medium, is 25 ms or longer; the ink includes a gelling agent in an amount of 0.5-3.0 mass % to the entire mass of the ink; and the complex viscosity of the ink at the temperature at which the ink lands on the recording medium is 50-300 Pa·s. According to this method, even when an inkjet image is formed at high speed using ink that (Continued)

experiences a sol-gel phase transition, an image free from white spots and gloss differences in the overlap areas can be formed.

7 Claims, 4 Drawing Sheets

(51) Int. Cl.
    *B41J 2/21*     (2006.01)
    *C09D 11/101*     (2014.01)
    *C09D 11/107*     (2014.01)
    *C09D 11/322*     (2014.01)
    *C09D 11/40*     (2014.01)
    *B41J 11/00*     (2006.01)

(52) U.S. Cl.
    CPC .......... *C09D 11/101* (2013.01); *C09D 11/107* (2013.01); *C09D 11/322* (2013.01); *C09D 11/40* (2013.01)

(56) References Cited

U.S. PATENT DOCUMENTS

| | | | | |
|---|---|---|---|---|
| 2011/0216124 A1* | 9/2011 | Maeda | ................. | C09D 11/101 347/20 |
| 2012/0092426 A1* | 4/2012 | Chopra | ................. | C09D 11/101 347/88 |
| 2012/0242729 A1* | 9/2012 | Takahashi | .............. | B41J 2/2132 347/12 |
| 2013/0044168 A1* | 2/2013 | Kaga | .................... | B41M 5/0023 347/102 |
| 2014/0232785 A1* | 8/2014 | Maeda | ................... | B41J 2/2146 347/37 |
| 2015/0062267 A1 | 3/2015 | Maeda et al. | | |

FOREIGN PATENT DOCUMENTS

| | | |
|---|---|---|
| JP | 2004050445 A | 2/2004 |
| JP | 2007185904 A | 7/2007 |
| JP | 2009132919 A | 6/2009 |
| JP | 2011213060 A | 10/2011 |
| JP | 2013226 A | 11/2013 |
| JP | 2013226745 A | 11/2013 |
| JP | 2013227445 A | 11/2013 |
| WO | 03000498 A1 | 1/2003 |
| WO | 2013094198 A1 | 6/2013 |
| WO | 2013150802 A1 | 10/2013 |
| WO | 2013157271 A1 | 10/2013 |
| WO | 2013161298 A1 | 10/2013 |
| WO | 2013161328 A1 | 10/2013 |
| WO | 2015001790 A1 | 1/2015 |

OTHER PUBLICATIONS

International Search Report corresponding to Application No. PCT/JP2015/060001; dated Jun. 9, 2015, with English translation.

Extended European Search Report for corresponding Application No. 15773507.7-1302/3127709 PCT/JP2015060001; dated Aug. 31, 2017.

* cited by examiner

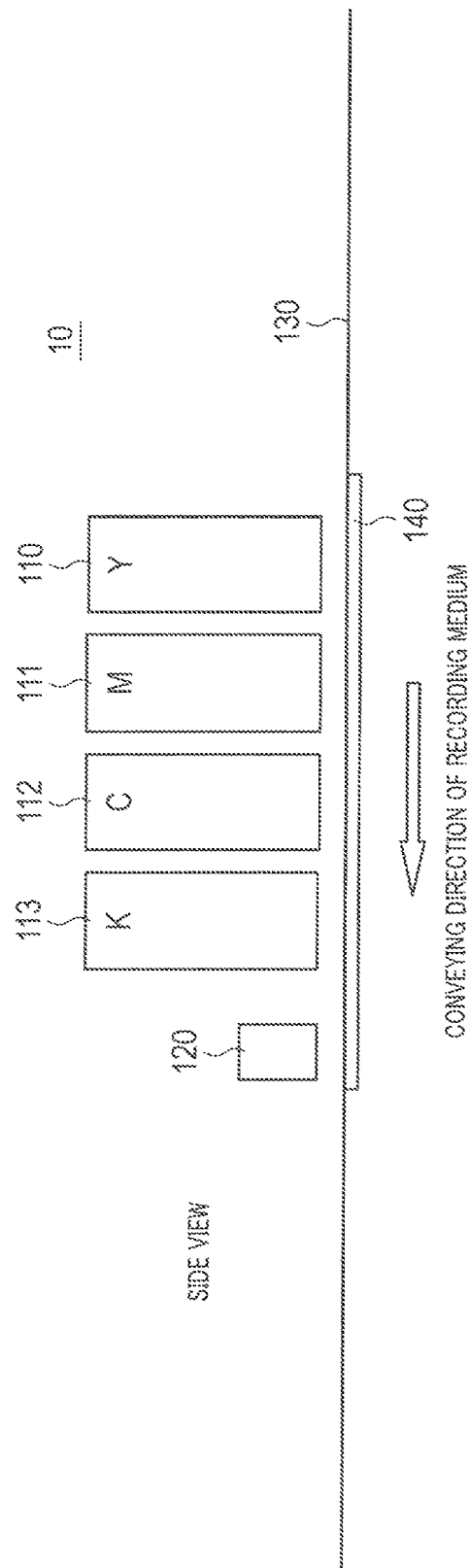

IMAGE FORMATION METHOD

This is the U.S. national stage of application No. PCT/JP2015/060001, filed on Mar. 30, 2015. Priority under 35 U.S.C. § 119(a) and 35 U.S.C. § 365(b) is claimed from Japanese Application No. 2014-077228, filed Apr. 3, 2014, the disclosure of which is also incorporated herein by reference.

TECHNICAL FIELD

The present invention relates to an image forming method.

BACKGROUND ART

From the viewpoint of simple and inexpensive image production, inkjet recording has been used in a variety of printing fields. As one of inkjet recording methods, there is an UV-curable inkjet method in which droplets of an ultraviolet-curable inkjet ink are landed on a recording medium and then irradiated with ultraviolet rays to be cured to thereby form images. The ultraviolet-curable inkjet method has recently been attracting attention for its capability of forming images having high rubfastness and adhesiveness even on recording media lacking the ink absorbing property.

For example, PTL 1 discloses a curable ink having such a characteristic that when the curable ink is printed and cured on a base material, the glossiness of a printed region on the base material matches closely with the glossiness of the non-printed region on the base material.

Further, for example, PTL 2 discloses an inkjet recording method in which by using a recording apparatus in which a plurality of inkjet heads having a plurality of ink discharging nozzles arrayed linearly thereon are disposed in zigzags along the array direction of the ink discharging nozzles, droplets composed of an ink composition discharged from the ink discharging nozzles are landed and printed on a recording medium conveyed along the direction orthogonal to the array direction; the method having a step of landing the droplets discharged from at least one of the ink discharging nozzles in the plurality of inkjet heads adjacent to each other in the orthogonal direction so that the droplets are mutually overlapped on the recording medium wherein the volume of the droplets discharged from at least one of the ink discharging nozzles is lower than the volume of the droplets discharged from the other ink discharging nozzles; and the ink composition has a yield value of 0.50 to 2.00 mPa.

CITATION LIST

Patent Literature

PTL 1
Japanese Patent Application Laid-Open No. 2009-132919
PTL 2
Japanese Patent Application Laid-Open No. 2011-213060

SUMMARY OF INVENTION

Technical Problem

Although the object of the invention described in PTL 1 is that the glossiness of a printed region on a base material matches closely with the glossiness of the non-printed region on the base material, there is no description of a specific measure to make the glossinesses closely match and correspond with each other. Further the temperature of a recording material in the ink landing time is 50° C. or lower, and the ink has a viscosity of $10^5$ to $10^7$ cp, which is a viscosity at a level of preventing even the penetration in a paper base material, that is, a high viscosity. Even if the temperature of the recording material is set at the phase transition temperature of −20 to −10° C., there does not occur proper combining leveling of neighboring dots.

Further as in the invention described in PTL 2, although it is known that by using a recording apparatus in which a plurality of inkjet heads are disposed in zigzags along the array direction of nozzles, ink droplets are landed so as to be mutually overlapped on a duplicated portion on a recording medium corresponding to adjacent head end parts of the plurality of the adjacent heads to thereby prevent the occurrence of any area (streaks, blanks) where no printing is made in an image by the heads due to the influence of curving of the ink in the ink jetting time, and the like, there is such a problem that in a ultraviolet-curable inkjet ink which undergoes reversible sol-gel phase transition, only by simply printing on the duplicated portion corresponding to the adjacent head end parts, the proper combining leveling cannot be attained, leading to the degradation of the image quality.

The present invention has been achieved in consideration of the above-mentioned situation, and has an object to provide an epochal image forming method in which even if images are formed at a high speed by a long-size line head or the like by using an actinic radiation-curable inkjet ink undergoing sol-gel phase transition capable of reducing color contamination and forming high-quality images, there can be formed images exhibiting no trouble of streaks (blanks) by superposed regions (connecting parts) of short-size recording element trains (modules), and exhibiting no sense of disorder in the image glossiness by the superposed regions (connecting parts).

Solution to Problem

Specific means for achieving the above objects include (1) to (7) below.
(1) An image forming method, including discharging an actinic radiation-curable inkjet ink by using a line head to thereby land the inkjet ink on a recording medium, and conveying the recording medium,
wherein the line head comprises a long-size recording element train;
the long-size recording element train comprises a plurality of modules;
each module of the plurality of modules comprises at least one short-size recording element train having a plurality of recording elements arrayed in a direction orthogonal to a conveying direction of the recording medium;
the plurality of modules are disposed in zigzags in a state of having a superposed region where end parts of at least two modules out of the plurality of modules, adjacent to each other in a direction of the short-size recording element train, are superposed in the direction orthogonal to the conveying direction of the recording medium;
a time interval is 25 ms or longer, the time interval being, from a landing time when a first ink is discharged from the short-size recording element train in one module of at least two modules in the superposed region and landed on the recording medium, to a landing time when the first ink or a second ink of the same color-based ink as the first ink is discharged from the short-size recording element train in the other module and landed on the recording medium;

the actinic radiation-curable inkjet ink comprises at least a gelling agent and undergoes temperature-induced reversible sol-gel phase transition; and the ink has a content of the gelling agent of 0.5 to 3.0 mass % relative to a total amount of the ink; and the ink has a complex viscosity of 50 to 300 Pa·s at a temperature of the ink when the actinic radiation-curable inkjet ink is landed on the recording medium.

(2) The image forming method according to (1), wherein an image formed by the superposed region has a dot ratio of 70% or higher.

(3) The image forming method according to (1) or (2), wherein the actinic radiation-curable inkjet ink is discharged only from second to fifteenth recording elements of the recording elements from an end part of the at least one short-size recording element train in the superposed region.

(4) The image forming method according to any one of (1) to (3), wherein the gelling agent is at least one compound among compounds represented by formulae (G1) and (G2):

   Formula (G1):

   Formula (G2):

wherein R1 to R4 each independently denote a hydrocarbon group having a straight chain moiety having 12 or more carbon atoms; and the actinic radiation-curable inkjet ink has a content of the gelling agent in which R1 to R4 have 20 or more carbon atoms of 0 to 0.9 mass % to a total mass thereof; and the actinic radiation-curable inkjet ink has a content of the gelling agent in which R1 to R4 have 12 or more carbon atoms of 1.0 to 2.4 mass % to a total mass thereof.

(5) The image forming method according to any one of (1) to (4), wherein the actinic radiation-curable inkjet ink exhibits a minimum dot diameter of 30 to 50 μm as formed by landing the ink on the recording medium.

(6) The image forming method according to any one of (1) to (5), wherein the actinic radiation-curable inkjet ink further comprises a photocurable compound and a photopolymerization initiator; and the method further comprises irradiating the actinic radiation-curable inkjet ink landed on the recording medium with actinic radiation to thereby cure the ink.

(7) The image forming method according to (6), including irradiating with the actinic radiation using an LED light source having a peak illuminance in a wavelength region of 370 to 410 nm and under conditions of a maximum illuminance of 0.5 to 6.0 W/cm$^2$ and an amount of light of smaller than 400 mJ/cm$^2$ on a surface of the actinic radiation-curable inkjet ink landed on the recording medium to thereby cure the actinic radiation-curable inkjet ink.

Advantageous Effects of Invention

According to one aspect of the present invention, there can be provided an epochal image forming method in which even if images are formed at a high speed by a long-size line head or the like by using an actinic radiation-curable inkjet ink undergoing sol-gel phase transition capable of reducing color contamination and forming high-quality images, there can be formed images exhibiting no trouble of streaks (blanks) by superposed regions (connecting parts) of short-size recording element trains (modules), and exhibiting no sense of disorder in the image glossiness by the superposed regions (connecting parts).

BRIEF DESCRIPTION OF DRAWINGS

FIG. 1A is a side view illustrating one example of a configuration of the main part of inkjet recording apparatus 10 of line recording type using the image forming method according to one aspect of the present invention;

DESCRIPTION OF EMBODIMENTS

Figure 1B:
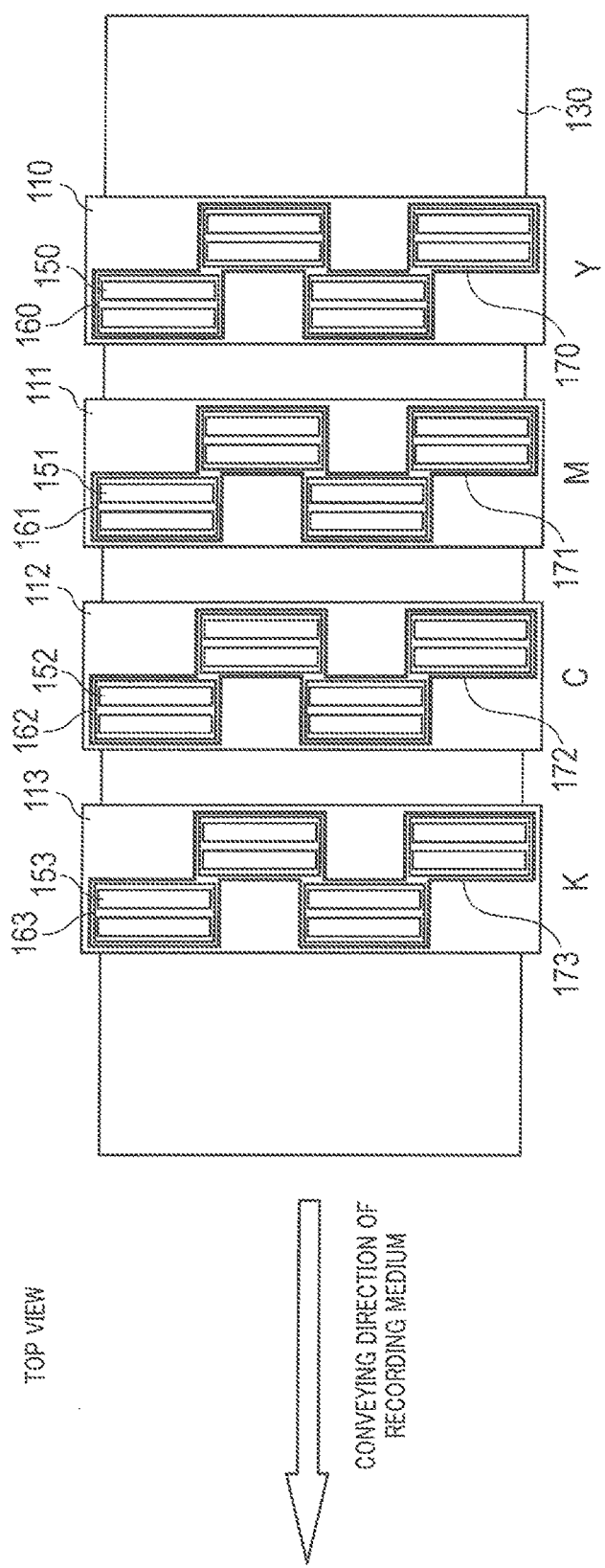
FIG. 1B is a top view illustrating one example of a configuration of the main part of inkjet recording apparatus 10 of line recording type using the image forming method according to one aspect of the present invention.

The present invention will be described in detail hereinafter.

1. Image Forming Method

The image forming method according to one aspect of the present invention is an image forming method including discharging an actinic radiation-curable inkjet ink by using a line head to thereby land the inkjet ink on a recording medium, and conveying the recording medium, wherein the line head has a long-size recording element train; the long-size recording element train is configured of a plurality of modules; each module of the plurality of modules has at least one short-size recording element train in which a plurality of recording elements are arrayed in the direction orthogonal to the conveying direction of the recording medium; the plurality of modules are disposed in zigzags in the state of having a superposed region where end parts of at least two modules out of the plurality of modules adjacent to each other in the short-size recording element train direction are superposed in the direction orthogonal to the conveying direction of the recording medium; a time interval is 25 ms or longer, the time interval being from a landing time at which a first ink is discharged from a short-size recording element train which one module of the at least two modules has in the superposed region and landed on the recording medium to a landing time when the first ink or a second ink of the same color-based one as the first ink is discharged from a short-size recording element train which the other module has, and landed on the recording medium; the actinic radiation-curable inkjet ink contains at least a gelling agent and undergoes temperature-induced reversible sol-gel phase transition; the content of the gelling agent is 0.5 to 3.0 mass % relative to the total mass of the ink; and the complex viscosity of the ink is 50 to 300 Pa·s at the temperature when the actinic radiation-curable inkjet ink is landed on the recording medium.

The image forming method according to one aspect of the present invention, even if images are formed at a high speed by a long-size line head or the like by using an actinic radiation-curable inkjet ink undergoing sol-gel phase transition capable of reducing the color contamination and forming high-quality images, has such an effect that there can be formed images exhibiting no trouble of streaks (blanks) by superposed regions (connecting parts) of short-size recording element trains (modules), and exhibiting no sense of disorder in the image glossiness by the superposed regions (connecting parts). Examples of the first ink and the second ink in the image forming method according to one aspect of the present invention include yellow-based inks, magenta-based inks, cyan-based inks and black-based inks. For example, if some two inks, even if having at least one color element different from each other among chroma, luminosity and hue, which are three elements of color, are mutually the same color-based ones, for example, yellow-based, magenta-based, cyan-based or black-based, the first ink and the second ink are regarded as same color-based inks in the image forming method according to one aspect of the present invention.

In the image forming method according to one aspect of the present invention, since superposed regions (connecting parts) of short-size recording element trains come to generate areas (streaks, blanks) where no printing is made in images by the influence of curving of inks in the ink jetting time, and the like, there are provided superposed regions on end parts of adjacent short-size recording element trains (heads or head modules).

The present inventors have found that there arises such a problem that when an actinic radiation-curable inkjet ink undergoing sol-gel phase transition is used, in a superposed region being a connecting part in the zigzag disposition, if there arises a difference of a certain or longer time in landing time of inks on a base material, the glossiness of an image by the superposed region being the connecting part comes to change as compared with the glossiness of images of the same-color portions surrounding the image, and the difference comes to be enabled to be visually recognized. This phenomenon is peculiar to the actinic radiation-curable inkjet ink undergoing sol-gel phase transition; the phenomenon becomes remarkable and poses a problem if in the superposed region of the end parts, the difference in landing time of respective inks discharged from both the short-size recording element trains having the superposed region formed on their end parts is 25 ms or longer; and the phenomenon becomes more remarkable and poses a problem if that is 50 ms or longer. Further the degree of leveling of the ink being landed later becomes insufficient, and there arise such a problem that its slight difference causes a glossiness difference between the image by the superposed region and images of the same-color portions surrounding the image, and the difference comes to be enabled to be visually recognized.

In order to solve the problem, it has been found that the problem can be solved by incorporating a gelling agent in the range of 0.5 to 3.0 mass % relative to the total mass of the actinic radiation-curable inkjet ink, and controlling the ink complex viscosity at a temperature at which the actinic radiation-curable inkjet ink is landed on a recording medium, at 50 to 300 Pa·s.

Particularly in an area where the printing dot ratio of an image formed by a superposed region is 70% or higher, the glossiness difference is likely to be conspicuous; and in an area where the printing dot ratio of an image formed by the superposed region is 80% or higher, the glossiness difference is likely to be more conspicuous; in such cases, the image forming method according to one aspect of the present invention more attains the effect.

Further by discharging the inks only from second to fifteenth recording elements from end parts of adjacent short-size recording element trains (modules) in the superposed region, the sense of disorder in the image glossiness is more dissolved; and more suitably, by making the superposed elements to be from second to eighth recording elements from the end parts of the short-size recording element trains, the sense of disorder in the image glossiness is more dissolved. In the image forming method according to one aspect of the present invention, in order to carry out line printing at a high speed exceeding a line speed of 50 m/min in a high resolution, it is preferable that an LED light source having a peak illuminance of 0.5 to 6 W/cm² (on a recording material surface) at 370 to 410 nm is used and curing is carried out in an amount of light of smaller than 400 mJ/cm², but under such a preferable condition, the problem is especially posed with the sense of disorder in the glossiness by the superposed region; however, employing the configuration according to one aspect of the present invention significantly solves this problem.

Further when the dot diameter formed after the actinic radiation-curable inkjet ink is landed on the recording medium is in the range of 30 to 50 μm, the sense of disorder in the glossiness by the superposed region is large; and when the dot diameter is in the range of 30 to 45 μm, the sense of disorder in the glossiness is larger; in such cases, the image forming method according to one aspect of the present invention more attains the effect.

[Discharging an Actinic Radiation-Curable Inkjet Ink by Using a Line Head and Landing the Inkjet Ink on a Recording Medium]

The image forming method according to one aspect of the present invention includes discharging an actinic radiation-curable inkjet ink by using a line head and landing the inkjet ink on a recording medium.

Droplets of the actinic radiation-curable inkjet ink are discharged by using the line head, and landed on the recording medium. In order to enhance the ability of ink droplets discharge, it is preferable that the temperature of the inkjet ink in the line head is set at a temperature higher by 10 to 30° C. than the gelation temperature. When the ink temperature in the line head is lower than (gelation temperature+10°) C., the ink undergoes gelation in the line head or the nozzle surface, and the ability of the ink droplets discharge are likely to decrease. On the other hand, when the ink temperature in the line head exceeds (gelation temperature+30°) C., since the ink temperature becomes too high, the ink components deteriorate in some cases. Hence, it suffices if the inkjet ink in the line head, an ink channel connected to the line head or an ink tank connected to the ink channel is heated and droplets of the inkjet ink at the above temperature is discharged.

The volume of the droplet per one drop discharged from each nozzle of the line head is, depending on the resolution of images, preferably 0.5 to 10 pl, and in order to form images in a high resolution, more preferably 0.5 to 4.0 pl. In order to form images in a high resolution in the above droplet volume, there is necessary the dissolving stability of a gelling agent in the actinic radiation-curable inkjet ink. Since the configuration of the actinic radiation-curable inkjet ink to be used in the image forming method according to one aspect of the present invention can secure the dissolving stability of the gelling agent, images in a high resolution can stably be formed even in the above droplet volume.

The ink droplets landed on the recording medium is cooled and quickly undergoes gelation due to the sol-gel phase transition. Accordingly, the ink droplets do not diffuse and can be pinned. Further since oxygen can hardly enter the ink droplets, curing of a photocurable compound is hardly inhibited by oxygen.

The recording medium may be a paper or may be a resin film. Examples of the paper include coated paper for printing and coated paper B for printing. Further examples of the resin film include polyethylene terephthalate films and vinyl chloride films.

By discharging the ink droplets from the line head, the ink droplets are landed and attached on the recording medium. It is preferable that the temperature of the recording medium when the ink droplets are landed is set at a temperature lower by 10 to 20° C. than the gelation temperature of the ink. When the temperature of the recording medium is too low, since the ink droplets excessively quickly undergo gelation and pinning, leveling of the ink droplets is not sufficiently caused, and the image glossiness decreases in some cases. On the other hand, when the temperature of the recording medium is excessively high, it is difficult for the ink droplets to undergo gelation, and therefore neighboring dots of the ink droplets may be mixed with each other. By appropriately adjusting the temperature of the recording medium, it is possible to achieve both a moderate level of leveling that does not allow for mixing among neighboring dots of the ink droplets and appropriate pinning In the image forming method according to one aspect of the present invention, as described above, the complex viscosity of the actinic radiation-curable inkjet ink at a temperature when the ink is landed on the recording medium is 50 to 300 Pa·s, and more preferably 70 to 280 Pa·s. This more preferable range of the viscosity can form images being reduced in the color contamination, exhibiting no trouble of streaks (blanks) by the superposed region (connecting part) and exhibiting no sense of disorder in the image glossiness by the superposed region (connecting part). Further the temperature (landing temperature) of the actinic radiation-curable inkjet ink when the ink is landed on the recording medium can suitably be established with respect to a temperature (represented as Tj) of the sol-gel phase transition, and is preferably −10° C. to −20° C. to Tj, and more preferably −12 to −18° C. The complex viscosity in the present invention is a value obtained by using a stress-controlled type rheometer (one example is a PhysicaMCR series, manufactured by Anton Paar GmbH) using a viscoelasticity measuring apparatus cone plate, and measuring changes with temperature of dynamic viscoelasticity at a temperature-fall rate of 0.1° C./s, at a strain of 5% and at an angular frequency of 10 rad/s. Further the temperature Tj of the sol-gel phase transition is a temperature at which the complex viscosity becomes 1.0 Pa or higher when the changes with temperature of the dynamic viscoelasticity are measured at a temperature-fall rate of 0.1° C./s, at a strain of 5% and at an angular frequency of 10 rad/s.

Since in the actinic radiation-curable inkjet ink to be used in the image forming method according to one aspect of the present invention, the gelling agent is stably dissolved in an ink solvent (photocurable compound and the like), the glossiness of images can be regulated by regulating the temperature of the recording medium. If the gelling agent cannot be present stably in the ink solvent, a part of the gelling agent is deposited in discharging and causes nozzle clogging, reducing the image quality. Further if after the ink is landed on the recording medium, crystallization of the gelling agent delays, even if the temperature of the recording medium is regulated, mixing of dots with one another is caused, reducing the image quality.

[Conveying the Recording Medium]

The image forming method according to one aspect of the present invention further includes conveying the recording medium.

The conveying speed of the recording medium can be set, for example, at between 1 to 120 m/s. The faster the conveying speed, the faster the image forming speed becomes. Particularly according to the image forming method according to one aspect of the present invention, in an inkjet recording apparatus of line recording type, even with a very fast line speed of an applicable line speed of 50 to 120 m/min, there can be formed images exhibiting no trouble of streaks (blanks) by superposed regions (connecting parts) of the short-size recording element trains (modules), and exhibiting no sense of disorder in the image glossiness by the superposed regions (connecting parts).

[Irradiating the Actinic Radiation-Curable Inkjet Ink Landed on the Recording Medium with Actinic Radiation to Thereby Cure the Ink]

The image forming method according to one aspect of the present invention preferably further includes irradiating the actinic radiation-curable inkjet ink landed on the recording medium with actinic radiation to thereby cure the ink.

By irradiating droplets of the actinic radiation-curable inkjet ink landed on the recording medium with light, a photocurable compound contained in the ink droplets is crosslinked or polymerized and the ink droplets are cured and make images.

Light irradiated to the ink droplets landed and attached on the recording medium may be optional light as long as having the effect of the present invention, but is preferably ultraviolet rays from LED light sources. Specifically, there can be used a water-cooled LED of 395 nm, manufactured by Phoseon Technology, Inc. Although the light source of ultraviolet rays can be a metal halide lamp or the like, use of an LED as the light source can attain the effect of preventing poor curing of the cured film surface of the ink droplets due to dissolution of the ink droplets by the radiant heat of the light source such as the metal halide lamp.

The irradiation condition of actinic radiation can suitably be established depending on the kind of the actinic radiation-curable inkjet ink, but the condition which does not cause combining of neighboring dots and provides proper dot leveling and can form high-resolution images is such that an LED light source having the highest illuminance in the wavelength region of 370 to 410 nm is used so that the highest illuminance at a surface of the ink landed and attached on the recording medium is preferably 0.5 to 6.0 W/cm$^2$, and more preferably 1 to 5 W/cm$^2$. The amount of light irradiated on the ink is preferably smaller than 400 mJ/cm$^2$. Here, with respect to the irradiation of actinic radiation, since the thickness of the ink is a negligible range, the regulation of the highest illuminance at the surface of the ink landed and attached may be carried out by regulation of the highest illuminance at the surface of the recording medium. Under such an irradiation condition, the sense of disorder in the glossiness by the superposed region of the head modules especially becomes a problem, but employing the configuration of the present invention can solve the problem.

The light irradiation to the droplets of the actinic radiation-curable inkjet ink to be used in the image forming method according to one aspect of the present invention is carried out, in order to prevent combining of the neighboring ink droplets, within 10 s after the ink droplets are landed and attached on the recording medium, preferably within 0.1 s to 5 s, and more preferably within 0.1 s to 2 s. It is preferable that the light irradiation is carried out after the ink droplets are discharged from all line heads (inkjet recording heads) housed in a head carriage.

[Actinic Radiation-Curable Inkjet Ink]

The actinic radiation-curable inkjet ink to be used in the image forming method according to one aspect of the present invention undergoes temperature-induced reversible sol-gel phase transition, and at least contains the gelling agent; and the content of the gelling agent is 0.5 to 3.0 mass % relative to the total mass of the ink. Further the actinic radiation-curable inkjet ink to be used in the image forming method according to one aspect of the present invention preferably contains a photocurable compound and a photopolymerization initiator. The first ink and the second ink may have the same composition or different compositions as long as being of the same color or the same-color based color.

The actinic radiation-curable inkjet ink, since containing the gelling agent, undergoes temperature-induced reversible sol-gel phase transition. The actinic radiation-curable inkjet ink to undergo sol-gel phase transition, since being a liquid (sol) at high temperatures, can be discharged in a sol state from the inkjet recording head. When the actinic radiation-curable inkjet ink is discharged at the high temperatures, the ink droplets (dots) are landed on the recording medium and then spontaneously cooled and undergoes gelation. Accordingly, combining of neighboring dots is prevented and the image quality can be enhanced.

In order to raise the ability of the ink discharge, it is preferable that the viscosity of the ink in a liquid state at high temperatures is a certain value or lower. Specifically, the viscosity of the actinic radiation-curable inkjet ink in a liquid state is preferably 3 to 20 Pa·s. On the other hand, in order to prevent combining of neighboring dots, it is preferable that the viscosity of the ink at room temperature after landing is a certain value or higher. In the image forming method according to one aspect of the present invention, the ink complex viscosity at the temperature at which the ink is landed on the recording medium is 50 to 300 Pa·s.

[Gelling Agent]

The gelling agent contained in the actinic radiation-curable inkjet ink to be used in the image forming method according to one aspect of the present invention has a function of causing the ink to undergo temperature-induced reversible sol-gel phase transition. Such a gelling agent suffices, at least, 1) if being capable of being dissolved in a photocurable compound at a temperature higher than the gelation temperature, and 2) if being capable of being crystallized in the ink at a temperature lower than the gelation temperature.

When the gelling agent is crystallized in an ink, it is preferable that a space three-dimensionally surrounded by plate-like crystals, a crystallization product of the gelling agent, is formed so that the photocurable compound is included in that space. A structure in which a photocurable compound is included in a space three-dimensionally surrounded by plate-like crystals can be referred to as a "card house structure." Once a card house structure is formed, the liquid photocurable compound can be maintained therein and ink droplets can be pinned. Accordingly, combining of liquid droplets can be prevented. It is preferable that the photocurable compound and the gelling agent dissolving in the ink are compatible with each other to form the card house structure. In contrast to this, if phase separation between the photocurable compound and the gelling agent dissolved in the ink occurs, the card house structure may be difficult to form.

In order to stably discharge the ink droplets from the inkjet recording apparatus, it is necessary that the compatibility of the photocurable compound with the gelling agent is good in the ink in a sol state (at high temperatures). Further in order to stably prevent combining of the droplets even in a high-speed printing, it is preferable that after the ink droplets are landed on the recording medium, the gelling agent is quickly crystallized and forms a firm card house structure.

Examples of such a gelling agent include:

aliphatic ketone compounds;

aliphatic ester compounds;

petroleum waxes such as paraffin wax, microcrystalline wax, and petrolatum;

plant-derived waxes such as candelilla wax, carnauba wax, rice wax, sumac wax, jojoba oil, solid jojoba wax, and jojoba ester;

animal-derived waxes such as beeswax, lanolin, and spermaceti;

mineral waxes such as montan wax and hydrogenated wax;

hydrogenated castor oil and hydrogenated castor oil derivatives;

modified waxes such as montan wax derivatives, paraffin wax derivatives, microcrystalline wax derivatives, and polyethylene wax derivatives;

higher fatty acids such as behenic acid, arachidic acid, stearic acid, palmitic acid, myristic acid, lauric acid, oleic acid, and erucic acid;

higher alcohols such as stearyl alcohol and behenyl alcohol;

hydroxystearic acids such as 12-hydroxystearic acid;

12-hydroxystearic acid derivatives;

fatty acid amides such as lauric acid amide, stearic acid amide, behenic acid amide, oleic acid amide, erucic acid amide, ricinoleic acid amide, and 12-hydroxystearic acid amide (e.g., NIKKA AMIDE series manufactured by Nippon Kasei Chemical Co., Ltd., ITOWAX series manufactured by Ito Oil Chemicals Co., Ltd., and FATTY AMID series manufactured by Kao Corporation);

N-substituted fatty acid amides such as N-stearyl stearic acid amide, N-oleyl palmitic acid amide;

specialty fatty acid amides such as N,N'-ethylene bis-stearylamide, N,N'-ethylene bis-12-hydroxystearylamide, and N,N'-xylylene bisstearylamide;

higher amines such as dodecylamine, tetradecylamine, and octadecylamine;

fatty acid ester compounds such as stearyl stearic acid, oleyl palmitic acid, glycerin fatty acid ester, sorbitan fatty acid ester, propylene glycol fatty acid ester, ethylene glycol fatty acid ester, and polyoxyethylene fatty acid ester (e.g., EMALLEX series manufactured by Nihon Emulsion Co., Ltd., RIKEMAL series manufactured by Riken Vitamin Co., Ltd., and POEM series manufactured by Riken Vitamin Co., Ltd.);

esters of sucrose fatty acids such as sucrose stearic acid and sucrose palmitic acid (e.g., RYOTO Sugar Ester series manufactured by Mitsubishi-Kagaku Foods Corporation);

synthetic waxes such as polyethylene wax and α-olefin-malic anhydride copolymer wax (UNILIN series manufactured by Baker-Petrolite, etc.);

dimeric acids;

dimer diols (PRIPOR series manufactured by CRODA International Plc, etc.);

fatty acid inulins such as inulin stearate;

fatty acid dextrins such as dextrin palmitate and dextrin myristate (RHEOPEARL series manufactured by Chiba Flour Milling Co., Ltd., etc.);

glyceryl behenate/eicosanedioate;

polyglyceryl behenate/eicosanedioate (NOMCORT series manufactured by Nisshin Oillio Group, Ltd., etc.);

amide compounds such as N-lauroyl-L-glutamic acid dibutylamide and N-(2-ethylhexanoyl)-L-glutamic acid dibutylamide (available from Ajinomoto Fine-Techno Co., Inc.);

dibenzylidene sorbitols such as 1,3:2,4-bis-O-benzylidene-D-glucitol (available from New Japan Chemical Co., Ltd. as GELOL D); and low molecular weight oil gelling agents described in Japanese Patent Application Laid-Open Nos. 2005-126507, 2005-255821, and 2010-111790.

Preferably, the ink contains a compound containing a straight-chain alkyl group having 12 or more carbon atoms, as the gelling agent. When the gelling agent contains a straight-chain alkyl group having 12 or more carbon atoms, the above-mentioned "card house structure" can be easily formed. The structure of the gelling agent may have a branched chain.

Specific examples of the gelling agent containing a straight-chain alkyl group having 12 or more carbon atoms include aliphatic ketone compounds, aliphatic ester compounds, higher fatty acids, higher alcohols, and fatty acid amides, which contain a straight-chain alkyl group having 12 or more carbon atoms. It is to be noted that a gelling agent having a polar group such as —OH or —COOH at the terminals of the alkyl chain may have poor stability in the ink in sol state and thus precipitation or phase separation may occur. Moreover, bleedout of the gelling agent from the cured film of the ink may occur slowly over time. In view of such a circumstance, the gelling agent is preferably an aliphatic ketone compound or an aliphatic ester compound. Examples of such a preferable gelling agent include compounds represented by the following Formulas (G1) and (G2):

  Formula (G1):

  Formula (G2):

In Formulae (G1) and (G2), R1 to R4 each independently denote a hydrocarbon group containing a straight chain moiety having 12 or more carbon atoms. R1 to R4 may contain a branched moiety.

In the image forming method according to one aspect of the present invention, it is preferable that the content of the gelling agent in which R1 to R4 have 20 or more carbon atoms is 0 to 0.9 mass % relative to the total mass of the actinic radiation-curable inkjet ink, and 0 mass % to 0.7 mass % is more preferable.

In Formula (G1), the hydrocarbon groups represented by R1 and R2 are each independently, preferably, an aliphatic hydrocarbon group containing a straight-chain moiety having 12 or more and 25 or less carbon atoms. If the straight-chain moiety contained in each of the aliphatic hydrocarbon groups represented by R1 and R2 has less than 12 carbon atoms, the resulting compound fails to function as a gelling agent due to the absence of sufficient crystallinity. In addition, sufficient space for enclosing therein the photocurable compound would not be formed in the above-mentioned card house structure. On the other hand, if the straight-chain moiety contained in each of the aliphatic hydrocarbon groups has more than 25 carbon atoms, the resulting compound would not be soluble in the ink unless the discharge temperature of the ink is raised, due to an excessively high melting point.

Examples of the aliphatic ketone compound represented by Formula (G1) include dilignoceryl ketone (C24-C24), dibehenyl ketone (C22-C22, melting point: 88° C.), distearyl ketone (C18-C18, melting point: 84° C.), dieicosyl ketone (C20-C20), dipalmityl ketone (C16-C16, melting point: 80° C.), dimyristyl ketone (C14-C14), dilauryl ketone (C12-C12, melting point: 68° C.), lauryl myristyl ketone (C12-C14), lauryl palmityl ketone (C12-C16), myristyl palmityl ketone (C14-C16), myristyl stearyl ketone (C14-C18), myristyl behenyl ketone (C14-C22), palmityl stearyl ketone (C16-C18), palmityl behenyl ketone (C16-C22), and stearyl behenyl ketone (C18-C22).

Examples of commercially available products of the compound represented by Formula (G1) include 18-Pentatriacontanon (manufactured by Alfa Aeser), Hentriacontan-16-on (manufactured by Alfa Aeser), and KAO Wax T1 (manufactured by Kao Corporation). These aliphatic ketone compounds may be contained either singly or as a mixture of two or more types in the ink.

In Formula (G2), the hydrocarbon groups represented by R3 and R4 are not particularly limited and are each independently, preferably, an aliphatic hydrocarbon group containing a straight-chain moiety having 12 or more and 26 or less carbon atoms. If the straight-chain moiety contained in each of the aliphatic hydrocarbon groups represented by R3 and R4 has 12 or more and 26 or less carbon atoms, the resulting compound can form the above-mentioned card house structure and does not have an excessively high melting point while having crystallinity necessary for the gelling agent, similarly to the compound represented by Formula (G1). Examples of the aliphatic ester compound represented by Formula (G2) include behenyl behenate (C21-C22, melting point: 70° C.), icosyl icosanoate (C19-C20), stearyl stearate (C17-C18, melting point: 60° C.), palmityl stearate (C17-C16), lauryl stearate (C17-C12), cetyl palmitate (C15-C16, melting point: 54° C.), stearyl palmitate (C15-C18), myristyl myristate (C13-C14, melting point: 43° C.), cetyl myristate (C13-C16, melting point: 50° C.), octyldodecyl myristate (C13-C20), stearyl oleate (C17-C18), stearyl erucate (C21-C18), stearyl linoleate (C17-C18), behenyl oleate (C18-C22), myricyl cerotate (C25-C16), stearyl montanate (C27-C18), behenyl montanate (C27-C22), arachidyl linoleate (C17-C20), and palmityl triacontanate (C29-C16).

Examples of commercially available products of the aliphatic ester compound represented by Formula (G2) include UNISTAR M-2222SL (manufactured by NOF Corporation), EXCEPARL SS (manufactured by Kao Corporation, melting point: 60° C.), EMALEX CC-18 (manufactured by Nihon Emulsion Co., Ltd.), AMREPS PC (manufactured by Kokyu Alcohol Kogyo Co., Ltd.), EXCEPARL MY-M (manufactured by Kao Corporation), SPERMACETI (manufactured by NOF Corporation), and EMALEX CC-10 (manufactured by Nihon Emulsion Co., Ltd.). Most of these commercially available products are mixtures of two or more types and may therefore be separated and purified, if necessary.

The aliphatic ester compound contained in the ink may be of one kind singly or a mixture of two or more kinds thereof.

The content of the gelling agent contained in the ink is 0.5 to 3.0 mass % relative to the total mass of the ink. The content is more preferably 1.0 to 2.4 mass %, and still more preferably 0.7 to 2.4 mass %. When the content is lower than 0.5 mass %, the gelation (temperature-induced sol-gel phase transition) of the ink droplets is insufficient and combining of dots cannot be prevented; on the other hand, when the amount of the gelling agent exceeds 3.0 mass %, the gelling agent is not sufficiently dissolved in the ink and proper dot leveling is not attained, causing the sense of disorder in the glossiness.

[Colorant]

The actinic radiation-curable inkjet ink to be used in the image forming method according to one aspect of the present invention preferably contains at least one selected from various types of well-known dyes and pigments, and more preferably contains a pigment. The first ink and the second ink preferably contain the same colorant or colorants selected so as to make inks of the same color-based colors.

Pigments which can be contained in the actinic radiation-curable inkjet ink will be listed in the below, but are not limited to these pigments.

C.I. Pigment Yellows 1, 2, 3, 12, 13, 14, 16, 17, 73, 74, 75, 81, 83, 87, 93, 95, 97, 98, 109, 114, 120, 128, 129, 138, 150, 151, 154, 155, 180, 185, 213

C.I. Pigment Reds 5, 7, 12, 22, 38, 48:1, 48:2, 48:4, 49:1, 53:1, 57:1, 63:1, 101, 112, 122, 123, 144, 146, 168, 184, 185, 202

C.I. Pigment Violets 19, 23

C.I. Pigment Blues 1, 2, 3, 15:1, 15:2, 15:3, 15:4, 18, 22, 27, 29, 60

C.I. Pigment Greens 7, 36

C.I. Pigment Whites 6, 18, 21

C.I. Pigment Black 7

Then, as a magenta pigment for a magenta ink to be used in the present invention, a mixed crystal pigment containing C.I. Pigment Violet 19 is preferably used; a mixed crystal pigment composed of particularly C.I. Pigment Violet 19 and C.I. Pigment Red 122 or 202 is more preferable; and a C.I. Pigment Violet 19/C.I. Pigment Red 202 mixed crystal pigment is still more preferable.

Since the mixed crystal pigment containing C.I. Pigment Violet 19 is used, as compared with C.I. Pigment Violet 19 singly, the color reproduction gamut is broad, and also in a secondary color high in the image density, a high density and a high chroma can be provided.

The volume-average particle diameter of the pigment is preferably 0.08 to 0.5 μm; and the particle diameter of the pigment is 0.3 to 10 μm, and preferably 0.3 to 3 μm. By controlling the particle size of the pigment, clogging in the nozzles of the inkjet recording head can be avoided, and ink storage stability, ink transparency, curing sensitivity can be maintained.

On the other hand, the dye which can be contained in the actinic radiation-curable inkjet ink can be an oil soluble dye and the like. Examples of the oil soluble dye include the following various dyes. Examples of magenta dye include MS Magenta VP, MS Magenta HM-1450, HM Magenta HSo-147 (all manufactured by Mitsui-Toatsu Chemicals), AIZEN SOT Red-1, AIZEN SOT Red-2, AIZEN SOT Red-3, AIZEN SOT Pink-1, SPIRON Red GEH SPECIAL (all manufactured by Hodogaya Chemical), RESOLIN Red FB 200%, MACROLEX Red Violet R, MACROLEX ROTSB (all manufactured by of Bayer Japan), KAYASET Red B, KAYASET Red 130, KAYASET Red 802 (all manufactured by Nippon Kayaku), PHLOXIN, ROSE BENGAL, ACID Red (all manufactured by Daiwa Kasei), HSR-31, DIARESIN Red K (all manufactured by Mitsubishi-Kasei), and Oil Red (manufactured by BASF Japan).

Examples of cyan dye include MS Cyan HM-1238, MS Cyan HSo-16, HM Cyan HSo-144, MS Cyan VPG (all manufactured by Mitsui-Toatsu Chemical), AIZEN SOT Blue-4 (manufactured by Hodogaya Chemical Company), RESOLIN BR, Blue BGLN 200%, MACROLEX Blue RR, CERES Blue GN, SIRIUS SUPRA TURQ Blue Z-BGL, SIRIUS SUPRA TURQ Blue FB-LL 330% (all manufactured by Bayer Japan), KAYASET Blue FR, KAYASET Blue N, KAYASET Blue 814, Turq. Blue GL-5 200, Light Blue BGL-5 200 (all manufactured by Nippon Kayaku), DAIWA Blue 7000, Oleosol Fast Blue GL (all manufactured by Daiwa Kasei), DIARESIN Blue P (manufactured by Mitsubishi-Kasei), SUDAN Blue 670, NEOPEN Blue 808, and ZAPON Blue 806 (all manufactured by BASF Japan).

Examples of yellow dye include MS Yellow HSm-41, Yellow KX-7, Yellow EX-27 (manufactured by Mitsui-Toatsu Chemical), AIZEN SOT Yellow-1, AIZEN SOT Yellow-3, AIZEN SOT Yellow-6 (all manufactured by Hodogaya Chemical), MACROLEX Yellow 6G, MACROLEX FLUOR Yellow 10GN (all manufactured by Bayer Japan), KAYASET Yellow SF-G, KAYASET Yellow 2G, KAYASET Yellow A-G, KAYASET Yellow E-G (all manufactured by Nippon Kayaku), DAIWA Yellow 330HB (manufactured by of Daiwa Kasei), HSY-68 (manufactured by Mitsubishi-Kasei), SUDAN Yellow 146, and NEOPEN Yellow 075 (all manufactured by BASF Japan).

Examples of black dye include MS Black VPC (manufactured by Mitsui-Toatsu Chemical), AIZEN SOT Black-1, AIZEN SOT Black-5 (all manufactured by Hodogaya Chemical), RESORIN Black GSN 200%, RESOLIN Black BS (all manufactured by Bayer Japan), KAYASET A-N (manufactured by Nippon Kayaku), DAIWA Black MSC (manufactured by Daiwa Kasei), HSB-202 (manufactured by Mitsubishi-Kasei), NEPTUNE Black X60, and NEOPEN Black X58 (all manufactured by BASF Japan).

The content of the pigment or the dye is, relative to the photocurable inkjet ink, preferably 0.1 to 20 mass %, and more preferably 0.4 to 10 mass %. This is because when the content of the pigment or the dye is too low, the color exhibition of obtained images is insufficient; and when being too high, the viscosity of the ink becomes high and the jetting property decreases. Further the inkjet ink may contain a synergist corresponding to various types of pigments as a dispersion assistant. The total amount of a dispersant and the dispersion assistant is preferably 1 to 50 mass % relative to the pigment.

The pigment must be dispersed in the inkjet ink. Therefore, it is preferable that the inkjet ink is obtained by preparing a pigment dispersion, and mixing the pigment dispersion with other ink components.

The preparation of the pigment dispersion is carried out by dispersing the pigment in a disperse medium. Dispersing of the pigment may be carried out, for example, by using a ball mill, sand mill, attritor, roll mill, agitator, Henschel mixer, colloid mill, ultrasound homogenizer, pearl mill, wet jet mill, paint shaker or the like. Further when dispersing of the pigment is carried out, a dispersant is allowed to be added. As the dispersant, a polymer dispersant is preferably used, and the polymer dispersant includes a Solsperse series of Avecia Co., Ltd. and a PB series of Ajinomoto Fine-Techno Co., Inc.

The disperse medium of the pigment dispersion can be a solvent or a polymerizable compound, but since it is preferable that the inkjet ink in the present invention undergoes gelation right after the inkjet ink is landed on the recording medium, the dispersion medium is preferably solventless. Further when the solvent ends up remaining in cured images, since there are caused the deterioration of solvent resistance and the problem of VOC of the remaining solvent, the ink is preferably a solventless ink. Therefore, it is preferable on the dispersion suitability that the disperse medium of the pigment dispersion is selected from not a solvent but a polymerizable compound, particularly a monomer having a lowest viscosity.

[Photocurable Compound]

The actinic radiation-curable inkjet ink to be used in the image forming method according to one aspect of the present invention suitably contains a photocurable compound and a photopolymerization initiator, which can improve the durability, the rubfastness and the adhesiveness with the recording medium of formed images.

The actinic radiation-curable inkjet ink contains the photocurable compound. The photocurable compound is a compound to be crosslinked or polymerized by irradiation of actinic radiation. The actinic radiation is, for example, electron beams, ultraviolet rays, a rays, y rays, and X-rays, and preferably ultraviolet rays. The photocurable compound is a radical polymerizable compound or a cationic polymerizable compound, and preferably a radical polymerizable compound.

The radical polymerizable compound is a compound (monomer, oligomer, polymer or mixture of these) which has an ethylenically unsaturated bond, which is radically polymerizable. The radical polymerizable compound may be used singly or in a combination of two or more.

Examples of the compounds having a radical polymerizable ethylenic unsaturated bond include unsaturated carboxylic acids and salts thereof, unsaturated carboxylate ester compounds, unsaturated carboxylic acid urethane compounds, unsaturated carboxylic acid amide compounds and anhydrides thereof, acrylonitrile, styrene, unsaturated polyesters, unsaturated polyethers, unsaturated polyamides, and unsaturated urethanes. Examples of the unsaturated carboxylic acid include (meth)acrylic acid, itaconic acid, crotonic acid, isocrotonic acid, and maleic acid.

Among these, the radical polymerizable compound is preferably an unsaturated carboxylate ester compound, and more preferably a (meth)acrylate compound. The (meth) acrylate compound may be not only a monomer, but also an oligomer, a mixture of a monomer and an oligomer, a modified substance thereof, an oligomer having a polymerizable functional group, or the like. The term "(meth) acrylate" indicates both or one of "acrylate" and "methacrylate" and the term "(meth)acryl" indicates both or one of "acryl" and "methacryl".

Examples of other polymerizable oligomers include epoxy acrylates, aliphatic urethane acrylates, aromatic urethane acrylates, polyester acrylates and straight chain acryl oligomers.

[Photopolymerization Initiator]

The photopolymerization initiator may be a radical polymerization initiator when the photocurable compound contains a radical polymerizable compound, and a cationic polymerization initiator when the photocurable compound contains a cationic polymerizable compound. The radical polymerization initiator includes an intermolecular bond cleaving type and an intermolecular hydrogen withdrawing type. Examples of the intermolecular bond cleaving type photopolymerization initiator include acetophenones such as diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl) ketone, 1-hydroxycyclohexyl-phenyl ketone, 2-methyl-2-morpholino(4-thiomethylphenyl)propan-1-one and 2-benzyl-2-dimethylamino-1-(4-morpholinophenyl)-butanone; benzoins such as benzoin, benzoin methyl ether and benzoin isopropyl ether; acylphosphine oxides such as 2,4,6-trimethylbenzoyl diphenylphosphine oxide; and benzil and methylphenyl glyoxy ester. Examples of the intramolecular hydrogen withdrawing type photopolymerization initiator include benzophenones such as benzophenone, o-benzoyl benzoic acid methyl-4-phenyl benzophenone, 4,4'-dichloro benzophenone, hydroxy benzophenone, 4-benzoyl-4'-methyldiphenyl sulfide, acrylated benzophenone, 3,3',4,4'-tetra-(t-butyl peroxy carbonyl) benzophenone; and 3,3'-dimethyl-4-methoxy benzophenone; thioxanthones such as 2-isopropyl thioxanthone, 2,4-dimethyl thioxanthone, 2,4-diethyl thioxanthone, and 2,4-dichloro thioxanthone; aminobenzophenones such as Michler's ketone and 4,4'-diethyl-aminobenzophenone; 10-butyl-2-chloro acridone, 2-ethyl anthraquinone, 9,10-phenanthrene quinone, camphor quinone, and triaryl phosphonium salt.

When the photopolymerization initiator is acylphosphine oxide or acyl phosphonate, sensitivity is satisfactory. Specific examples of the preferred photopolymerization initiator include bis(2,4,6-trimethylbenzoyl)-phenylphosphine oxide and bis(2,6-dimethoxybenzoyl)-2,4,4-trimethyl-pentylphosphine oxide.

The content of the photopolymerization initiator contained in the actinic radiation-curable inkjet ink is, though depending on light irradiated in the ink curing time, the kind of the photocurable compound, and the like, relative to the total mass of the ink, preferably 0.1 mass % to 10 mass % and more preferably 2 to 8 mass %.

The actinic radiation-curable inkjet ink, if necessary, may further contain a photopolymerization initiator auxiliary agent and a polymerization inhibitor. The photopolymerization initiator auxiliary agent may be a tertiary amine compound and is preferably an aromatic tertiary amine compound. Examples of the aromatic tertiary amine compound include N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxy ethylaniline, triethylamine, and N,N-dimethyl hexylamine Among them, N,N-dimethylamino-p-benzoic acid ethyl ester and N,N-dimethylamino-p-benzoic acid isoamyl ethyl ester are preferable. These compounds may be contained in the ink either singly or in combination.

Examples of the polymerization inhibitor include (alkyl) phenol, hydroquinone, catechol, resorcin, p-methoxyphenol, t-butyl catechol, t-butyl hydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferrone, aluminum N-nitrosophenyl hydroxylamine, tri-p-nitrophenylmethyl, N-(3-oxyanilino-1, 3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime.

[Other Components]

The actinic radiation-curable inkjet ink, if necessary, may further contain other components. The other components may be various types of additives, other resins and the like. Examples of the additives include surfactants, leveling agents, matting agents, ultraviolet absorbers, infrared absorbers, antibacterial agents, and basic compounds that serve to increase the storage stability of the ink. Examples of the basic compounds include basic alkali metal compounds, basic alkali earth metal compounds, and basic organic compounds such as amines Examples of the other resins include resins for regulating the physical properties of a cured film, and include polyester resins, polyurethane resins, vinyl resins, acrylic resins, rubber resins, and waxes.

[Method for Preparing the Actinic Radiation-Curable Inkjet Ink]

In the image forming method according to one aspect of the present invention, the actinic radiation-curable inkjet ink is obtained by mixing, under heating, a gelling agent contained therein, and a photocurable compound, a photopolymerization initiator, a colorant and the like suitably contained therein. For example, a pigment dispersion in which the colorant (particularly a pigment) is dispersed in a part of the photocurable compound is prepared and mixed with other ink components. The obtained ink is preferably filtered with a predetermined filter. In order to enhance the ability of discharge of the actinic radiation-curable inkjet ink, it is preferable that the viscosity of the ink at a high temperature is a certain value or lower. Specifically, it is preferable that the viscosity at the jetting temperature (dissolving temperature) of the actinic radiation-curable inkjet ink is 3 to 20 mPa·s.

2. Inkjet Recording Apparatus

The image forming method according to one aspect of the present invention can be carried out by using an inkjet recording apparatus of line recording type (single pass recording type). Hereinafter, by reference to FIG. 1A to FIG. 3, an inkjet recording apparatus of line recording type (single pass recording type) will be described in detail. Here, the inkjet recording apparatus of line recording type (single pass recording type) using the image forming method according to one aspect of the present invention is not limited to an inkjet recording apparatus of line recording type (single pass recording type) illustrated in FIG. 1A to FIG. 3 without departing from the object and the gist of the present invention.

FIG. 1A is a side view illustrating one example of a configuration of the main part of an inkjet recording apparatus of line recording type using one mode of the image forming method according to one aspect of the present invention; and FIG. 1B is its top view.

Inkjet recording apparatus 10 of line recording type illustrated in FIG. 1A has a head carriage (not illustrated in figure, the same applies hereinafter) housing a plurality of inkjet recording line heads 110 to 113 for a yellow ink, a magenta ink, a cyan ink and a black ink, ink channels (not illustrated in figure, the same applies hereinafter) connected to the head carriage, ink tanks (not illustrated in figure, the same applies hereinafter) storing the inks to be supplied through the ink channels, LED light source 120 covering the entire width of recording medium 130 and being disposed downstream (in the conveying direction of the recording medium) of the head carriage, and temperature control section 140 installed on the opposite side of the recording medium to inkjet recording line heads 110 to 113. As illustrated in FIG. 1B, the plurality of line heads 110 to 113 have long-size recording element trains 170 to 173, respectively; and long-size recording element trains 170 to 173 are configured of modules 160 to 163 disposed in zigzags, respectively. In FIG. 1B, long-size recording element trains 170 to 173 are each configured of four modules. Modules 160 to 163 have, respectively, short-size recording element trains 150 to 153 each having a plurality of recording elements arrayed in the direction orthogonal to the conveying direction of the recording medium. In FIG. 1B, one module has two short-size recording element trains.

The head carriage is fixed and disposed so as to cover the entire width of recording medium 130, and houses the plurality of inkjet recording line heads 110 to 113 which are installed for respective colors to be applied. The plurality of line heads 110 to 113 are so configured that the yellow ink, the magenta ink, the cyan ink and the black ink are supplied thereto, respectively. For example, the plurality of line heads 110 to 113 may be so configured that the inks are supplied from ink cartridges not illustrated in figure detachably installed in the inkjet recording apparatus 10, or the like, directly or through ink supply means not illustrated in figure.

Inkjet recording line heads 110 to 113 each may be disposed in plural numbers for each color in the conveying direction of recording medium 130. The numbers of respective inkjet recording line heads 110 to 113 disposed in the conveying direction of recording medium 130 are established by the nozzle density of inkjet recording line heads 110 to 113, and the resolution of printed images. For example, in the case where one modules 160 to 163 are made by using two of respective inkjet recording heads (short-size recording element trains 150 to 153) each having a droplet volume of 3.5 pl and a nozzle density of 600 dpi for the yellow ink, the magenta ink, the cyan ink and the black ink, and images having a resolution of 1,200 dpi are formed, it suffices if respective four inkjet recording modules 160 to 163 for the yellow ink, the magenta ink, the cyan ink and the black ink are disposed shiftingly in the conveying direction of recording medium 130. Further, though not illustrated by figure, in the case where respective inkjet recording heads (short-size recording element trains) each having a droplet volume of 7.0 pl and a nozzle density of 600 dpi for the yellow ink, the magenta ink, the cyan ink and the black ink, and images having a resolution of 600×600 dpi are formed, one short-size recording element trains are used and disposed in zigzags. dpi represents the number of ink droplets (dots) per 2.54 cm. In the image forming method according to one aspect of the present invention, the difference in time at which the same color-based color inks are landed by the superposed region due to the disposition in zigzags of the head modules (short-size recording element trains) is 25 ms or longer.

The ink tanks are connected to the head carriage through the ink channels. The ink channels are passages for supplying the inks in the ink tanks to the head carriage. In order to stably discharge the ink droplets, the inks in the ink tanks, the ink channels, the head carriage and inkjet recording line heads 110 to 113 are heated to a predetermined temperature to thereby maintain a gel state.

LED light source 120 covers the entire width of recording medium 130, and is disposed downstream of the head carriage in the conveying direction of the recording medium. LED light source 120 irradiates droplets discharged from inkjet recording line heads 110 to 113 and landed on the recording medium with light to thereby cure the droplets.

Figure 2:
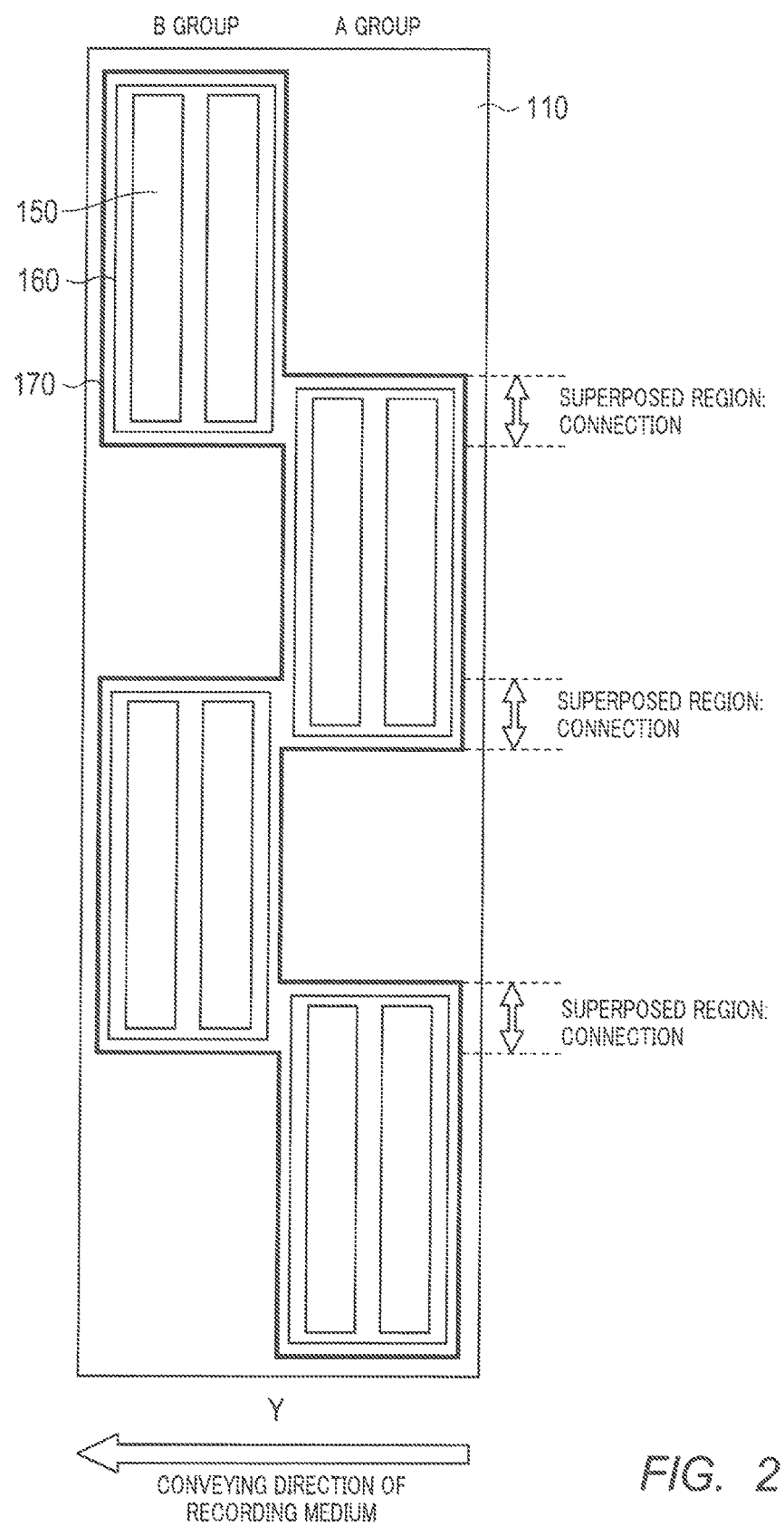
FIG. 2 is a top view of line head 110 (long-size recording element train 170) for a yellow ink of inkjet recording apparatus 10 of line recording type using the image forming method according to one aspect of the present invention.

FIG. 2 is a top view (enlarged view) of line head 110 (long-size recording element train 170) for the yellow ink of inkjet recording apparatus 10 of line recording type using the image forming method according to one aspect of the present invention. In FIG. 2, modules are divided into two modules in A group and two modules in B group in the order in the conveying direction of the recording medium; and two modules 160 in the A group and two modules 160 in the B group are disposed in zigzags as a whole, and three superposed regions (connections) are formed in the direction orthogonal to the conveying direction of the recording medium by the two modules in the A group and the two modules in the B group.

Figure 3:
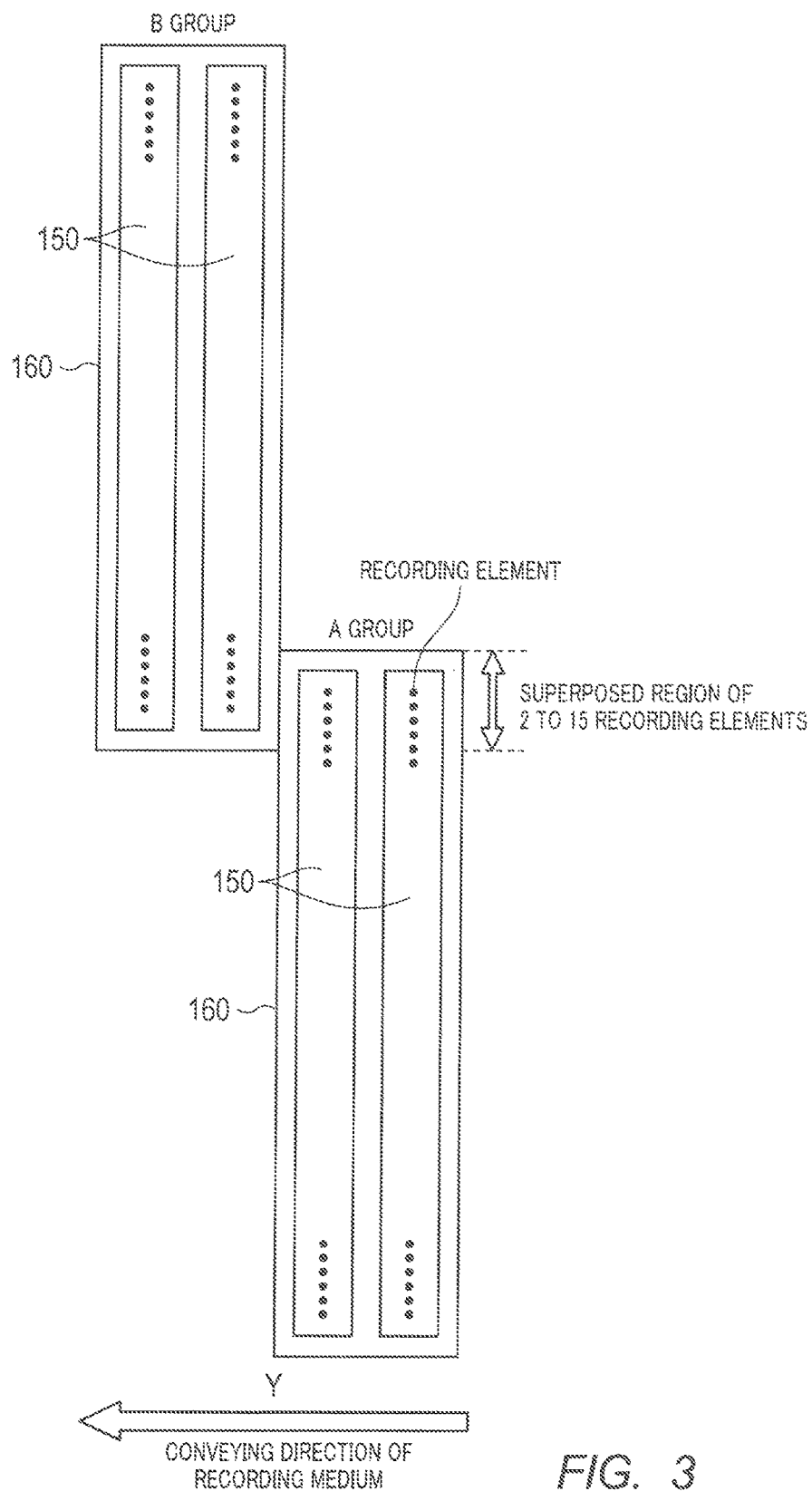
FIG. 3 is a top view of a part (module 160) of line head 110 (long-size recording element train 170) for a yellow ink of inkjet recording apparatus 10 of line recording type using the image forming method according to one aspect of the present invention.

FIG. 3 is a top view (more enlarged view than in FIG. 2) of a part (modules 160) of line head 110 (long-size recording element train 170) for the yellow ink of inkjet recording apparatus 10 of line recording type using the image forming method according to one aspect of the present invention. In FIG. 3, one module 160 in the A group and one module 160 in the B group configure a superposed region (connection) in the short-size recording element train direction, in the direction orthogonal to the conveying direction of the recording medium; and the superposed region corresponds to a region for second to fifteenth recording elements.

EXAMPLES

Hereinafter, the present invention will be described more specifically by way of Examples, but the present invention is not any more limited to the following Examples.

Actinic radiation-curable inkjet inks for Examples and Comparative Examples were prepared using the following components.

(Photocurable Compounds)

Miramer M166 (manufactured by Miwon Co., Ltd.): nonylphenol 8EO modified acrylate (molecular weight: 626, ClogP value: 6.42)

Miramer M360 (manufactured by Miwon Co., Ltd.): trimethylolpropane 3PO modified triacrylate (molecular weight: 471, ClogP value: 4.90)

NK Ester DOD-N (manufactured by Shin-Nakamura Chemical Co., Ltd.): 1,10-decanediol dimethacrylate (molecular weight: 310, ClogP value: 5.75)

NK Ester A-DCP (manufactured by Shin-Nakamura Chemical Co., Ltd.): tricyclodecanedimethanol diacrylate (molecular weight: 304, ClogP value: 4.69)

NK Ester APG-100 (manufactured by Shin-Nakamura Chemical Co., Ltd.): dipropylene glycol diacrylate SR230 (manufactured by Sartomer): diethylene glycol diacrylate NK Ester A-9300 (manufactured by Shin-Nakamura Chemical Co., Ltd.): isocyanurate triacrylate (molecular weight: 423, melting point: 53° C.)

NK Ester A-TMM-3L (manufactured by Shin-Nakamura Chemical Co., Ltd.): tetramethylolmethane triacrylate NK Ester A-9550 (manufactured by Shin-Nakamura Chemical Co., Ltd.): dipentaerythritol polyacrylate SR355 (manufactured by Sartomer): ditrimethylolpropane tetraacrylate GENOMER3414 (manufactured by RAHN & Co.): a polyester acrylate ETERCURE6234 (Eternal Chemical Co., Ltd.): an epoxy acrylate oligomer (Gelling Agents)

Unister M-9676 (manufactured by NOF Corp.): stearyl stearate

Nissan Electol® WEP-2 (manufactured by NOF Corp.): an ester wax having a melting point of 60° C. ($C_{<19}$ straight chain)

Nissan Electol® WEP-3 (manufactured by NOF Corp.): an ester wax having a melting point of 70° C. ($C_{\geq 20}$ straight chain)

Kao Wax T1 (manufactured by Kao Corp.): distearyl ketone 22-tritetracontanone (reagent)

(Surfactant)

BYK-307 (manufactured by BYK-Chemie GmbH)

(Photopolymerization Initiators)

IRGACURE 819 (manufactured by BASF)

DETX (manufactured by Lambson Co., Ltd.)

IRGACURE 369 (manufactured by BASF)

IRGACURE 907 (manufactured by BASF)

(Auxiliary Sensitizer)

Speedcure EHA (manufactured by Lambson Co., Ltd.) tertiary amine compound (Polymerization Inhibitor)

Irgastab UV-10 (manufactured by Ciba Speciality Chemicals Corp.)

(Preparation of Pigment Dispersions)

Pigment dispersions 1 to 4 were prepared through the following procedure.

Two compounds indicated in the below were put in a stainless steel beaker, and heated and stirred for 1 hour under heating on a hot plate at 65° C.

BYK-9151 (manufactured by BASF): 9 parts by weight

Dipropylene glycol diacrylate (APG-100, manufactured by Shin-Nakamura Chemical Co., Ltd., molecular weight: 242): 71 parts by weight The resultant was cooled to room temperature; thereafter, 20 parts by weight of one of pigments indicated in the below was added thereto, and put in a glass bottle together with 200 g of zirconia beads of 0.5 mm in diameter, and the glass bottle was sealed. The resultant was subjected to a dispersing treatment on a paint shaker for a time indicated in the below, and then, the zirconia beads were removed.

Pigment 1: Pigment Black 7 (manufactured by Mitsubishi Chemical Corp., #52), for 5 hours Pigment 2: Pigment Blue 15:4 (manufactured by Dainichiseika Color & Chemicals Mfg. Co., Ltd., Chromofine Blue 6332JC), for 5 hours Pigment 3: Pigment Red 122 (manufactured by Dainichiseika Color & Chemicals Mfg. Co., Ltd., Chromofine Red 6112JC), for 8 hours Pigment 4: Pigment Yellow 150 (manufactured by Lanxess Corp., E4GN-GT CH20015), for 8 hours (Preparation of Inks)

Each compound indicated in the following Table 1 to Table 7 was mixed in a compositional ratio indicated therein; and the mixed liquids were heated and stirred at 80 to 100° C. to thereby fabricate actinic radiation-curable inks undergoing sol-gel phase transition (Ink Comparatives 1 to 3, and Ink Compositions 1 to 4). The obtained inks were filtered under heating with a Teflon®-3 μm membrane filter, manufactured by ADVANTEC Toyo Kaisha, Ltd. Thereafter, the inks were similarly filtered with a Teflon®-3 μm membrane filter, manufactured by Advantec Toyo Kaisha, Ltd. The unit of the components in Table 1 to Table 7 is parts by weight.

Here, respective inks of Ink Comparatives 4 to 6 are inks of Example Ink Nos. 27 to 30 of Japanese Patent Application Laid-Open No. 2012-41441, and ink compositions of Examples 1 and 7 of WO2012/132406 using dispersion liquids 1 to 4 of the present invention as their pigment dispersion; and Ink Comparative 7 is inks of Nos. 5 to 8 of Example Inks of Japanese Patent Application Laid-Open No. 2009-132929.

TABLE 1

| Ink Comparative 1 | | | K | C | M | Y |
|---|---|---|---|---|---|---|
| Pigment Dispersion | 1 | | 12.5 | | | |
| | 2 | | | 12.5 | | |
| | 4 | | | | 21.0 | |
| | 3 | | | | | 15.0 |
| Photocurable Compound | APG-100 | | 25.4 | 26.9 | 18.4 | 22.9 |
| Photocurable Compound | A-DCP | | 30.0 | 30.0 | 30.0 | 30.0 |
| Photocurable Compound | A-9550 | | 15.0 | 15.0 | 15.0 | 15.0 |
| Oligomer | ETERCURE6234 | | 5.0 | 5.0 | 5.0 | 5.0 |
| Gelling Agent | — | | 0.0 | 0.0 | 0.0 | 0.0 |
| Surfactant | KF-352(Shin-Etsu Chemical Co., Ltd.) | | 0.1 | 0.1 | 0.1 | 0.1 |

TABLE 1-continued

| Ink Comparative 1 | | K | C | M | Y |
|---|---|---|---|---|---|
| Photopolymerization Initiator | 819 | 5.0 | 5.0 | 5.0 | 5.0 |
| Photopolymerization Initiator | 369 | 3.0 | 3.0 | 3.0 | 3.0 |
| Photopolymerization Initiator | DETX | 2.0 | 0.5 | 0.5 | 2.0 |
| Polymerization Inhibitor | UV-10 | 0.1 | 0.1 | 0.1 | 0.1 |
| Auxiliary Sensitizer | Speedcure EHA | 2.0 | 2.0 | 2.0 | 2.0 |

TABLE 2

| Ink Comparative 2 | | K | C | M | Y |
|---|---|---|---|---|---|
| Pigment Dispersion | 1 | 12.5 | | | |
| | 2 | | 12.5 | | |
| | 4 | | | 21.0 | |
| | 3 | | | | 15.0 |
| Photocurable Compound | APG-100 | 25.0 | 26.5 | 18.0 | 22.5 |
| Photocurable Compound | A-DCP | 30.0 | 30.0 | 30.0 | 30.0 |
| Photocurable Compound | A-9550 | 15.0 | 15.0 | 15.0 | 15.0 |
| Oligomer | ETERCURE6234 | 5.0 | 5.0 | 5.0 | 5.0 |
| Gelling Agent | M-9676 | 0.4 | 0.4 | 0.4 | 0.4 |
| Surfactant | KF-352 (Shin-Etsu Chemical Co., Ltd.) | 0.1 | 0.1 | 0.1 | 0.1 |
| Photopolymerization Initiator | 819 | 5.0 | 5.0 | 5.0 | 5.0 |
| Photopolymerization Initiator | 369 | 3.0 | 3.0 | 3.0 | 3.0 |
| Photopolymerization Initiator | DETX | 2.0 | 0.5 | 0.5 | 2.0 |
| Polymerization Inhibitor | UV-10 | 0.1 | 0.1 | 0.1 | 0.1 |
| Auxiliary Sensitizer | Speedcure EHA | 2.0 | 2.0 | 2.0 | 2.0 |

TABLE 3

| Ink Comparative 3 | | K | C | M | Y |
|---|---|---|---|---|---|
| Pigment Dispersion | 1 | 12.5 | | | |
| | 2 | | 12.5 | | |
| | 4 | | | 21.0 | |
| | 3 | | | | 15.0 |
| Photocurable Compound | APG-100 | 19.4 | 20.9 | 12.4 | 16.9 |
| Photocurable Compound | A-DCP | 30.0 | 30.0 | 30.0 | 30.0 |
| Photocurable Compound | A-9550 | 15.0 | 15.0 | 15.0 | 15.0 |
| Oligomer | ETERCURE6234 | 5.0 | 5.0 | 5.0 | 5.0 |
| Gelling Agent | M-9676 | 6.0 | 6.0 | 6.0 | 6.0 |
| Surfactant | KF-352 (Shin-Etsu Chemical Co., Ltd.) | 0.1 | 0.1 | 0.1 | 0.1 |
| Photopolymerization Initiator | 819 | 5.0 | 5.0 | 5.0 | 5.0 |
| Photopolymerization Initiator | 369 | 3.0 | 3.0 | 3.0 | 3.0 |
| Photopolymerization Initiator | DETX | 2.0 | 0.5 | 0.5 | 2.0 |
| Polymerization Inhibitor | UV-10 | 0.1 | 0.1 | 0.1 | 0.1 |
| Auxiliary Sensitizer | Speedcure EHA | 2.0 | 2.0 | 2.0 | 2.0 |

TABLE 4

| Ink Composition 1 | | K | C | M | Y |
|---|---|---|---|---|---|
| Pigment Dispersion | 1 | 12.5 | | | |
| | 2 | | 12.5 | | |
| | 4 | | | 21.0 | |
| | 3 | | | | 15.0 |
| Photocurable Compound | APG-100 | 23.3 | 24.8 | 16.3 | 20.8 |
| Photocurable Compound | A-DCP | 30.0 | 30.0 | 30.0 | 30.0 |

TABLE 4-continued

| Ink Composition 1 | | K | C | M | Y |
|---|---|---|---|---|---|
| Photocurable Compound | A-9550 | 15.0 | 15.0 | 15.0 | 15.0 |
| Oligomer | ETERCURE6234 | 5.0 | 5.0 | 5.0 | 5.0 |
| Gelling Agent | M-9676 | 0.7 | 0.7 | 0.7 | 0.7 |
| Gelling Agent | T1 | 1.4 | 1.4 | 1.4 | 1.4 |
| Surfactant | KF-352 (Shin-Etsu Chemical Co., Ltd.) | 0.1 | 0.1 | 0.1 | 0.1 |
| Photopolymerization Initiator | 819 | 5.0 | 5.0 | 5.0 | 5.0 |
| Photopolymerization Initiator | 369 | 3.0 | 3.0 | 3.0 | 3.0 |
| Photopolymerization Initiator | DETX | 2.0 | 0.5 | 0.5 | 2.0 |
| Polymerization Inhibitor | UV-10 | 0.1 | 0.1 | 0.1 | 0.1 |
| Auxiliary Sensitizer | Speedcure EHA | 2.0 | 2.0 | 2.0 | 2.0 |

TABLE 5

| Ink Composition 2 | | K | C | M | Y |
|---|---|---|---|---|---|
| Pigment Dispersion | 1 | 12.5 | | | |
| | 2 | | 12.5 | | |
| | 4 | | | 21.0 | |
| | 3 | | | | 15.0 |
| Photocurable Compound | DOD-N | 18.1 | 19.6 | 11.1 | 15.6 |
| Photocurable Compound | A-DCP | 30.0 | 30.0 | 30.0 | 30.0 |
| Photocurable Compound | A-TMM-3L | 15.0 | 15.0 | 15.0 | 15.0 |
| Photocurable Compound | A-9300 | 5.0 | 5.0 | 5.0 | 5.0 |
| Oligomer | GENOMER3414 | 5.0 | 5.0 | 5.0 | 5.0 |
| Gelling Agent | WEP-3 | 0.8 | 0.8 | 0.8 | 0.8 |
| Gelling Agent | T1 | 1.5 | 1.5 | 1.5 | 1.5 |
| Surfactant | KF-352 (Shin-Etsu Chemical Co., Ltd.) | 0.1 | 0.1 | 0.1 | 0.1 |
| Photopolymerization Initiator | 819 | 5.0 | 5.0 | 5.0 | 5.0 |
| Photopolymerization Initiator | 369 | 3.0 | 3.0 | 3.0 | 3.0 |
| Photopolymerization Initiator | DETX | 2.0 | 0.5 | 0.5 | 2.0 |
| Polymerization Inhibitor | UV-10 | 0.1 | 0.1 | 0.1 | 0.1 |
| Auxiliary Sensitizer | Speedcure EHA | 2.0 | 2.0 | 2.0 | 2.0 |

TABLE 6

| Ink Composition 3 | | K | C | M | Y |
|---|---|---|---|---|---|
| Pigment Dispersion | 1 | 12.5 | | | |
| | 2 | | 12.5 | | |
| | 4 | | | 21.0 | |
| | 3 | | | | 15.0 |
| Photocurable Compound | DOD-N | 18.3 | 19.8 | 11.3 | 15.8 |
| Photocurable Compound | A-DCP | 30.0 | 30.0 | 30.0 | 30.0 |
| Photocurable Compound | A-TMM-3L | 15.0 | 15.0 | 15.0 | 15.0 |
| Photocurable Compound | A-9300 | 5.0 | 5.0 | 5.0 | 5.0 |
| Oligomer | GENOMER3414 | 5.0 | 5.0 | 5.0 | 5.0 |
| Gelling Agent | 22-Tritetracontane | 0.5 | 0.5 | 0.5 | 0.5 |
| Gelling Agent | M-9676 | 1.6 | 1.6 | 1.6 | 1.6 |
| Surfactant | KF-352 (Shin-Etsu Chemical Co., Ltd.) | 0.1 | 0.1 | 0.1 | 0.1 |
| Photopolymerization Initiator | 819 | 5.0 | 5.0 | 5.0 | 5.0 |
| Photopolymerization Initiator | 369 | 3.0 | 3.0 | 3.0 | 3.0 |
| Photopolymerization Initiator | DETX | 2.0 | 0.5 | 0.5 | 2.0 |

TABLE 6-continued

| Ink Composition 3 | | K | C | M | Y |
|---|---|---|---|---|---|
| Polymerization Inhibitor | UV-10 | 0.1 | 0.1 | 0.1 | 0.1 |
| Auxiliary Sensitizer | Speedcure EHA | 2.0 | 2.0 | 2.0 | 2.0 |

TABLE 7

| Ink Composition 4 | | K | C | M | Y |
|---|---|---|---|---|---|
| Pigment Dispersion | 1 | 12.5 | | | |
| | 2 | | 12.5 | | |
| | 4 | | | 21.0 | |
| | 3 | | | | 15.0 |
| Photocurable Compound | SR230 | 19.0 | 20.5 | 12.0 | 16.5 |
| Photocurable Compound | M360 | 17.0 | 17.0 | 17.0 | 17.0 |
| Photocurable Compound | A-TMM-3L | 20.0 | 20.0 | 20.0 | 20.0 |
| Photocurable Compound | M166 | 10.0 | 10.0 | 10.0 | 10.0 |
| Oligomer | ETERCURE6234 | 5.0 | 5.0 | 5.0 | 5.0 |
| Gelling Agent | WEP-2 | 0.5 | 0.5 | 0.5 | 0.5 |
| Gelling Agent | WEP-3 | 0.9 | 0.9 | 0.9 | 0.9 |
| Surfactant | KF-352 (Shin-Etsu Chemical Co., Ltd.) | 0.1 | 0.1 | 0.1 | 0.1 |
| Photopolymerization Initiator | 819 | 5.0 | 5.0 | 5.0 | 5.0 |
| Photopolymerization Initiator | 369 | 3.0 | 3.0 | 3.0 | 3.0 |
| Photopolymerization Initiator | 907 | 3.0 | 3.0 | 3.0 | 3.0 |
| Photopolymerization Initiator | DETX | 2.0 | 0.5 | 0.5 | 2.0 |
| Polymerization Inhibitor | UV-10 | 0.1 | 0.1 | 0.1 | 0.1 |
| Auxiliary Sensitizer | Speedcure EHA | 2.0 | 2.0 | 2.0 | 2.0 |

(Measurement of the Complex Viscosity)

The complex viscosity of each ink (sample Nos. 1 to 22) was obtained by using a stress-controlled type rheometer (one example is a PhysicaMCR series, manufactured by Anton Paar GmbH) using a viscoelasticity measuring apparatus cone plate, and measuring changes with temperature of dynamic viscoelasticity at a temperature-fall rate of 0.1° C./s, at a strain of 5% and at an angular frequency of 10 rad/s. The complex viscosity value at a printing base material temperature (ink landing temperature) of the each ink (sample Nos. 1 to 22) is shown in the following Table 8.

(Image Formation)

The each ink (sample Nos. 1 to 22) was loaded on an inkjet recording apparatus having inkjet recording heads having piezo-type inkjet nozzles. The inks were discharged from this apparatus to an A3-size coated paper (OK Top Coat Plus, manufactured by Oji Paper Co., Ltd.), and there were printed black ink gradation images (in dot ratio intervals of 10% up to a dot ratio-100%-solid image), and "希" of a MS Ming type character of 3 pt and 5 pt each in black ink on a dot ratio-100%-solid portion in yellow, magenta and cyan each. The minimum dot diameter of the black ink for the each ink (sample Nos. 1 to 22) was measured using an optical microscope (VHX-500, Keyence Corp.).

An ink supply system was configured by being composed of ink tanks, ink channels, sub-ink tanks right before inkjet recording heads, piping with filters, and piezo heads. In the inkjet recording apparatus, two per color of piezo heads (short-size recording element trains) of 600 dpi in resolution were disposed in the conveying direction, and in the transverse direction, modules each of the two piezo heads (short-size recording element trains) were disposed in zigzags at four places and the recording resolution was made to be 1,200×1,200 dpi. The widths of superposed portions by the zigzag disposition were made to be those indicated in Table 8. The landing time difference by the black superposed region of the each ink (sample Nos. 1 to 22) was determined by dividing a length between nozzles in the superposed region by a printing linear speed.

The inks from the ink tanks to the head sections were heated at 90° C. Further, a voltage was applied to the piezo head so that each droplet volume became 3.5 pl by 1 dpd and 7.0 pl by 2 dpd, to thereby print each color. Printing for areas of 50% or lower in dot ratio was carried out by 1 dpd; and for areas of 50% or higher in dot ratio, half of the dots was printed in 7.0 pl by 2 dpd. The difference in landing time by the superposed portion of the head zigzag disposition between the same-color inks was 70 ms. Here, dpd has a meaning of the number of drops per 1 dot. 2 dpd means that printing of 1 dot is carried out by two drops.

As comparison, one per color of the piezo head (short-size recording element train) of 600 dpi was disposed in the conveying direction, and in the transverse direction, four piezo heads were disposed in zigzags at four places and the recording resolution was made to be 600×600 dpi. A voltage was applied to the piezo head (short-size recording element train) so that each droplet volume became 7.0 pl, to thereby print each color (printing on the entire region was carried out in 7.0 pl). The difference in landing time by the superposed region in the case of the zigzag disposition of one piezo heads (short-size recording element trains) was 20 ms.

After the image formation, the inks were irradiated with light of a wavelength of 395 nm for a water-cooled LED lamp, manufactured by Heraeus Holding GmbH, to thereby cure the inks. The distance from the LED lamp surface to the recording medium surface was made to be 50 mm. At this time, the maximum illuminance at the recording medium surface was made to be 3.5 W/cm$^2$, and the conveying speed of the recording medium was made to be 60 m/min. The amount of light irradiated was 400 mJ/cm$^2$. As comparison, this procedure was carried out also in the case where the distance from the LED lamp surface to the recording medium surface was made to be 10 mm (at this time, the maximum illuminance at the recording medium surface was made to be 8.0 W/cm$^2$). The measurement of the amount of light was carried out using ultraviolet power meters C9536 and H9958, manufactured by Hamamatsu Photonics K.K.

(Image Evaluation)

The each ink (sample Nos. 1 to 22) fabricated in the above was evaluated as follows.

Blank

Whether any blank (unprinted portion due to cissing, combining of dots, liquid gathering) was present on a black solid image portion was visually checked. The evaluation was carried out according to the following criteria.

A: no blank was present.

B: blanks were present on one or two places, but were in levels practically posing no problem.

C: a large number of blanks were generated.

The Sense of Disorder in the Glossiness by the Superposed Region (Connecting Part)

There were visually compared portions of a black solid image by the superposed region (connecting part) of the short-size recording element trains (modules) and portions thereof by the other region.

A: there was no glossiness difference.

B: there was a slight glossiness difference, but in levels practically posing no problem (the difference in 60° glossiness was smaller than 8).

C: there was clearly a glossiness difference, in levels not allowing the use.

Character Quality (Color Contamination)

Printed character images were visually observed. The character quality was evaluated according to the following criteria.

A: 3-pt characters were recorded clearly to their details.

B: 3-pt characters were illegible, but 5-pt characters were legible.

C: some of 5-pt characters were illegible.

(Image Evaluation Results and Consideration)

The image evaluation results are shown in the following Table 8 and Table 9. As is clear from Table 8 and Table 9, the image forming method according to the configuration of the present application can form images exhibiting no sense of disorder in the glossiness by the head connecting part and exhibiting high resolution in a high-speed line printing system in which heads are disposed in zigzags.

TABLE 8

| Sample No. | Ink Composition | Landing Temperature (Recording Medium Temperature) (° C.) | Complex Viscosity of Black Ink at Landing Temperature (Pa · s) | Minimum Dot Diameter (μm) | Landing Time Difference by Black Superposed Region (ms) |
|---|---|---|---|---|---|
| 1 | Ink Comparative 1 | 25 | — | 50 | 80 |
| 2 | Ink Comparative 2 | 40 | 10 | 48 | 80 |
| 3 | Ink Comparative 3 | 52 | 1100 | 35 | 80 |
| 4 | Ink Comparative 4 | 47 | 900 | 38 | 80 |
| 5 | Ink Comparative 5 | 52 | 700 | 40 | 80 |
| 6 | Ink Comparative 6 | 48 | 500 | 40 | 80 |
| 7 | Ink Comparative 7 | 52 | 1500 | 33 | 80 |
| 8 | Ink Composition 2 | 48 | 250 | 62 (printing only by 2 dpd) | 20 |
| 9 | Ink Comparative 4 | 47 | 900 | 54 (printing only by 2 dpd) | 20 |
| 10 | Ink Comparative 6 | 48 | 500 | 57 (printing only by 2 dpd) | 20 |
| 11 | Ink Composition 1 | 45 | 100 | 44 | 80 |
| 12 | Ink Composition 2 | 48 | 250 | 42 | 80 |
| 13 | Ink Composition 2 | 48 | 250 | 42 | 80 |
| 14 | Ink Composition 3 | 45 | 150 | 46 | 80 |
| 15 | Ink Composition 4 | 38 | 220 | 48 | 80 |
| 16 | Ink Composition 2 | 48 | 250 | 42 | 80 |
| 17 | Ink Composition 3 | 45 | 150 | 46 | 80 |
| 18 | Ink Composition 4 | 38 | 220 | 48 | 80 |
| 19 | Ink Composition 1 | 45 | 100 | 44 | 80 |
| 20 | Ink Composition 2 | 48 | 250 | 42 | — |
| 21 | Ink Composition 2 | 48 | 250 | 62 (printing only by 2 dpd) | 80 |
| 22 | Ink Composition 2 | 48 | 250 | 42 | 80 |

| Sample No. | Printing by Black Superposed Region | Black Superposed Region (Recording Element) | Illuminance (W/cm²) | Remarks |
|---|---|---|---|---|
| 1 | entire region | 50 pixels | 3.5 | Comparative Example 1 |
| 2 | entire region | 50 pixels | 3.5 | Comparative Example 2 |
| 3 | entire region | 50 pixels | 3.5 | Comparative Example 3 |
| 4 | entire region | 50 pixels | 3.5 | Comparative Example 4 |
| 5 | entire region | 50 pixels | 3.5 | Comparative Example 5 |
| 6 | entire region | 50 pixels | 3.5 | Comparative Example 6 |
| 7 | entire region | 50 pixels | 3.5 | Comparative Example 7 |
| 8 | entire region | 50 pixels | 3.5 | Comparative Example 8 |
| 9 | entire region | 50 pixels | 3.5 | Comparative Example 9 |
| 10 | entire region | 50 pixels | 3.5 | Comparative Example 10 |
| 11 | entire region | 50 pixels | 3.5 | the present invention 1 |

TABLE 8-continued

| | | | | | |
|---|---|---|---|---|---|
| 12 | entire region | 50 pixels | | 3.5 | the present invention 2 |
| 13 | only for a dot ratio of 70% or higher | 50 pixels | | 3.5 | the present invention 3 |
| 14 | only for a dot ratio of 70% or higher | 50 pixels | | 3.5 | the present invention 4 |
| 15 | only for a dot ratio of 70% or higher | 50 pixels | | 3.5 | the present invention 5 |
| 16 | entire region | 10 pixels | | 3.5 | the present invention 6 |
| 17 | entire region | 10 pixels | | 3.5 | the present invention 7 |
| 18 | entire region | 10 pixels | | 3.5 | the present invention 8 |
| 19 | only for a dot ratio of 70% or higher | 10 pixels | | 3.5 | the present invention 9 |
| 20 | — | 0 | | 3.5 | Comparative Example 11 |
| 21 | only for a dot ratio of 70% or higher | 10 pixels | | 3.5 | the present invention 10 |
| 22 | only for a dot ratio of 70% or higher | 10 pixels | | 8.0 | the present invention 11 |

TABLE 9

| Sample No. | Blank | Sense of Disorder in Glossiness by Superposed Region Black Solid Printing Portion | Character Quality K on YMC | Remarks |
|---|---|---|---|---|
| 1 | A | A | C | Comparative Example 1 |
| 2 | A | A | C | Comparative Example 2 |
| 3 | A | C | A | Comparative Example 3 |
| 4 | A | C | A | Comparative Example 4 |
| 5 | A | C | A | Comparative Example 5 |
| 6 | A | C | A | Comparative Example 6 |
| 7 | A | C | A | Comparative Example 7 |
| 8 | A | A | C | Comparative Example 8 |
| 9 | A | B | C | Comparative Example 9 |
| 10 | A | B | C | Comparative Example 10 |
| 11 | A | B | B | the present invention 1 |
| 12 | A | B | A | the present invention 2 |
| 13 | A | A | A | the present invention 3 |
| 14 | A | A | A | the present invention 4 |
| 15 | B | A | A | the present invention 5 |
| 16 | A | A | A | the present invention 6 |
| 17 | A | A | A | the present invention 7 |
| 18 | B | A | A | the present invention 8 |
| 19 | A | A | B | the present invention 9 |
| 20 | C | A | A | Comparative Example 11 |
| 21 | A | A | B | the present invention 10 |
| 22 | A | B | B | the present invention 11 |

INDUSTRIAL APPLICABILITY

The image forming method according to one aspect of the present invention is suitable for the image formation on the recording medium by the actinic radiation-curable inkjet ink.

This application is entitled to and claims the benefit of Japanese Patent Application No. 2014-077228, filed on Apr. 3, 2014. The contents of the specification and drawings of this application are incorporated herein by reference in its entirety.

REFERENCE SIGNS LIST

10 Inkjet recording apparatus
110 to 113 Line head
120 LED light source
130 Recording medium
140 Temperature control section
150 to 153 Short-size recording element train
160 to 163 Module
170 to 173 Long-size recording element train

The invention claimed is:

1. An image forming method, comprising discharging an actinic radiation-curable inkjet ink by using a line head to thereby land the inkjet ink on a recording medium, and conveying the recording medium,
    wherein the line head comprises a long-size recording element train;
    the long-size recording element train comprises a plurality of modules;
    each module of the plurality of modules comprises at least one short-size recording element train having a plurality of recording elements arrayed in a direction orthogonal to a conveying direction of the recording medium;
    the plurality of modules are disposed in zigzags in a state of having a superposed region where end parts of at least two modules, out of the plurality of modules, adjacent to each other in a direction of the short-size recording element train, are superposed in the direction orthogonal to the conveying direction of the recording medium;
    a time interval, determined by dividing a length between recording elements in the conveying direction in the superposed region by a printing linear speed, is 25 ms or longer, the time interval being, from a landing time when a first ink is discharged from the short-size recording element train in one module of at least two modules in the superposed region and landed on the recording medium, to a landing time when the first ink or a second ink of the same color-based ink as the first ink is discharged from the short-size recording element train in the other module and landed on the recording medium;
    the actinic radiation-curable inkjet ink comprises at least a gelling agent and undergoes temperature-induced reversible sol-gel phase transition; and
    the ink has a content of the gelling agent of 0.5 to 3.0 mass % relative to a total amount of the ink; and the ink has a complex viscosity of 50 to 300 Pa·s at a temperature of the ink when the actinic radiation-curable inkjet ink is landed on the recording medium.

2. The image forming method according to claim 1, wherein an image formed by the superposed region has a dot ratio of 70% or higher.

3. The image forming method according to claim 1, wherein the actinic radiation-curable inkjet ink is discharged only from second to fifteenth recording elements of the recording elements from an end part of the at least one short-size recording element train in the superposed region.

4. The image forming method according to claim 1, wherein the gelling agent is at least one compound among compounds represented by formulae (G1) and (G2):

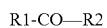  Formula (G1):

  Formula (G2):

wherein R1 to R4 each independently denote a hydrocarbon group having a straight chain moiety having 12 or more carbon atoms; and the actinic radiation-curable inkjet ink has a content of the gelling agent in which R1 to R4 have 20 or more carbon atoms of 0 to 0.9 mass % to a total mass thereof; and the actinic radiation-curable inkjet ink has a content of the gelling agent in which R1 to R4 have 12 or more carbon atoms of 1.0 to 2.4 mass % to a total mass thereof.

5. The image forming method according to claim 1, wherein the actinic radiation-curable inkjet ink exhibits a minimum dot diameter of 30 to 50 μm as formed by landing the ink on the recording medium.

6. The image forming method according to claim 1, wherein the actinic radiation-curable inkjet ink further comprises a photocurable compound and a photopolymerization initiator; and the method further comprises irradiating the actinic radiation-curable inkjet ink landed on the recording medium with actinic radiation to thereby cure the ink.

7. The image forming method according to claim 6, comprising irradiating with the actinic radiation using an LED light source having a peak illuminance in a wavelength region of 370 to 410 nm and under conditions of a maximum illuminance of 0.5 to 6.0 W/cm$^2$ and an amount of light of smaller than 400 mJ/cm$^2$ on a surface of the actinic radiation-curable inkjet ink landed on the recording medium to thereby cure the actinic radiation-curable inkjet ink.

* * * * *